US012076637B2

(12) United States Patent
Yun et al.

(10) Patent No.: US 12,076,637 B2
(45) Date of Patent: Sep. 3, 2024

(54) VIRTUAL EXTREME GOLF SYSTEM

(71) Applicant: PhiNetworks Co., Ltd., Seoul (KR)

(72) Inventors: Suk Kyung Yun, Seoul (KR); Jin Wook Hong, Seoul (KR)

( * ) Notice: Subject to any disclaimer, the term of this patent is extended or adjusted under 35 U.S.C. 154(b) by 0 days.

(21) Appl. No.: 17/884,557

(22) Filed: Aug. 9, 2022

(65) Prior Publication Data
US 2023/0059907 A1 Feb. 23, 2023

(30) Foreign Application Priority Data

Aug. 20, 2021 (KR) ........................ 10-2021-0110252

(51) Int. Cl.
*A63F 13/46* (2014.01)
*A63F 13/211* (2014.01)
*A63F 13/245* (2014.01)
*A63F 13/812* (2014.01)

(52) U.S. Cl.
CPC .......... *A63F 13/211* (2014.09); *A63F 13/245* (2014.09); *A63F 13/46* (2014.09); *A63F 13/812* (2014.09); *A63F 2300/105* (2013.01); *A63F 2300/1062* (2013.01); *A63F 2300/61* (2013.01); *A63F 2300/8011* (2013.01)

(58) Field of Classification Search
CPC ...... A63F 13/211; A63F 13/245; A63F 13/46; A63F 13/812; A63F 2300/105; A63F 2300/1062
See application file for complete search history.

(56) References Cited

U.S. PATENT DOCUMENTS

| 8,678,892 | B2* | 3/2014 | Ok | G09B 19/0038 463/3 |
| 2004/0198524 | A1* | 10/2004 | Kwon | A63B 24/0021 473/151 |
| 2009/0191929 | A1* | 7/2009 | Nicora | A63F 13/798 463/3 |
| 2011/0028196 | A1* | 2/2011 | Choi | A63B 24/0021 463/43 |
| 2012/0267855 | A1* | 10/2012 | Choi | A63B 24/0021 273/317.2 |
| 2013/0144411 | A1* | 6/2013 | Savarese | A63B 55/00 700/91 |
| 2014/0274240 | A1* | 9/2014 | Meadows | A63F 13/216 463/3 |
| 2016/0158640 | A1* | 6/2016 | Gupta | A63F 13/812 463/3 |

(Continued)

Primary Examiner — David L Lewis
Assistant Examiner — Shauna-Kay Hall

(57) ABSTRACT

Disclosed is a virtual extreme golf system including a sensor that generates step information by measuring a user's step and generates swing information by measuring angular velocity and acceleration of a stick, a controller that includes a DB unit in which course information is stored, a position change unit changing a position of a ball on a course through the swing information and generating position information of the ball, and a time calculation unit that generates time information by calculating a movement time of the user to a position of the ball before the swing and a position of the ball after the swing on the course by using the step information, and an output device that receives and outputs at least one of the course information, the position information, and the time information.

3 Claims, 2 Drawing Sheets

(56) References Cited

U.S. PATENT DOCUMENTS

| | | | |
|---|---|---|---|
| 2016/0175673 A1* | 6/2016 | Shibuya | G06Q 20/24 |
| | | | 473/223 |
| 2019/0255407 A1* | 8/2019 | Rivas | A63F 13/812 |
| 2019/0269994 A1* | 9/2019 | Okazaki | A63B 69/3658 |
| 2020/0206597 A1* | 7/2020 | Lee | G09B 5/06 |
| 2021/0220727 A1* | 7/2021 | Bramble | A63F 13/812 |

* cited by examiner

1: SENSING MEANS
3: OUTPUT MEANS
5: STICK

VIRTUAL EXTREME GOLF SYSTEM

BACKGROUND

1. Field of the Invention

The present invention relates to a virtual extreme golf system, and more particularly, to a virtual extreme golf system for enjoying extreme golf in an indoor space.

2. Discussion of Related Art

Recently, the general public's perception of golf is changing due to the expansion of leisure life, the increase in national income, and the like. Golf, which was considered only for the wealthy in the past, has become a popular sport that may be enjoyed by all people of all ages, regardless of age or gender, due to the increase in golf infrastructure, the spread of screen golf, and the like.

Extreme golf means a golf game in which the faster you hole out a set course, the more extra points users get, unlike the conventional golf which is somewhat static. In other words, golf is a game that counts the time from tee shot to hole out and the number of strokes to determine superiority and inferiority.

The Registration Patent No. 10-2203176 (hereinafter referred to as the related art) as the related art relates to a golf game providing system and a golf game providing method using the same, and more specifically, may provide a more accurate detailed analysis of a current state of a club to provide a golf game environment that is as identical to the real environment as possible, implement golf ball hitting to a client without a delay in calculating an impact time point, and furthermore, more completely implement various situations for address, swing, impact, etc., on the client, thereby improving satisfaction of users of the golf game.

However, the related art has a problem that the above-described extreme golf may not be implemented virtually in an indoor space because users may not reflect, for example, the time required to move to the hole-in in a score.

SUMMARY OF THE INVENTION

The present invention provides a virtual extreme golf system that enables a user to enjoy extreme golf in an indoor space.

In addition, the present invention provides a virtual extreme golf system with less space constraints.

Further, the present invention provides a virtual extreme golf system capable of reflecting a user's stride.

The present invention for the purpose of solving the above problems has the following configurations and features.

According to an aspect of the present invention, a virtual extreme golf system includes a sensing means that generates step information by measuring a user's step and generates swing information by measuring angular velocity and acceleration of a stick, control means that includes a DB unit in which course information is stored, a position change unit changing a position of a ball on a course through the swing information and generating position information of the ball, and a time calculation unit that generates time information by calculating a movement time of the user to a position of the ball before the swing and a position of the ball after the swing on the course by using the step information, and output means that receives and outputs at least one of the course information, the position information, and the time information.

The sensing means may be provided on the stick, and may generate the step information as the stick moves up and down.

The control means may further include a stride storage unit in which a user's stride determined according to setting information transmitted from an input means is stored, in which the time calculation unit may generate the time information by using the step information and the user's stride.

The control means may further include the number of strokes calculation unit that calculates the number of strokes up to a hole-in based on the swing information and the position information to generate the number of strokes information, and a score calculation unit that calculates a score by using the number of strokes information and the time information, in which the score may be made by a sum of the score by the number of strokes and the score by the movement time of the user, and the score based on the movement time of the user may be weighted 60 times the score based on the number of strokes.

DETAILED DESCRIPTION OF EXEMPLARY EMBODIMENTS

The present invention may be variously modified and have several forms. Therefore, implementation (aspect) (or embodiments) will be described in detail in the text. However, it is to be understood that the present invention is not limited to a specific disclosed form, but includes all modifications, equivalents, and substitutions without departing from the scope and sprit of the present invention.

The terminology used herein is only used to describe a specific implementation (aspect) (or embodiment), and is not intended to limit the present invention. Singular forms are intended to include plural forms unless the context clearly indicates otherwise. It should be understood that terms "~include" or "~composed of" used in the present specification, specify the presence of features, numerals, steps, operations, components, parts mentioned in the present specification, or combinations thereof, but do not preclude the presence or addition of one or more other features, numerals, steps, operations, components, parts, or combinations thereof.

Unless being defined otherwise, it is to be understood that all the terms used in the present specification including technical and scientific terms have the same meanings as those that are generally understood by those skilled in the art. Terms generally used and defined by a dictionary should be interpreted as having the same meanings as meanings within a context of the related art and should not be interpreted as having ideal or excessively formal meanings unless being clearly defined otherwise in the present specification.

The "~first", "~second", etc., described in the present specification are only referred to distinguish that they are different components, and are not limited to the order of manufacture, and their names in the detailed description and claims of the invention are may not match.

Throughout the present specification, when any one part is referred to as being "connected to" another part, it means that any one part and another part are "directly connected to (communicably connected to)" each other or are "indirectly connected to (communicably connected to)" each other with the other part interposed therebetween.

Figure 1:
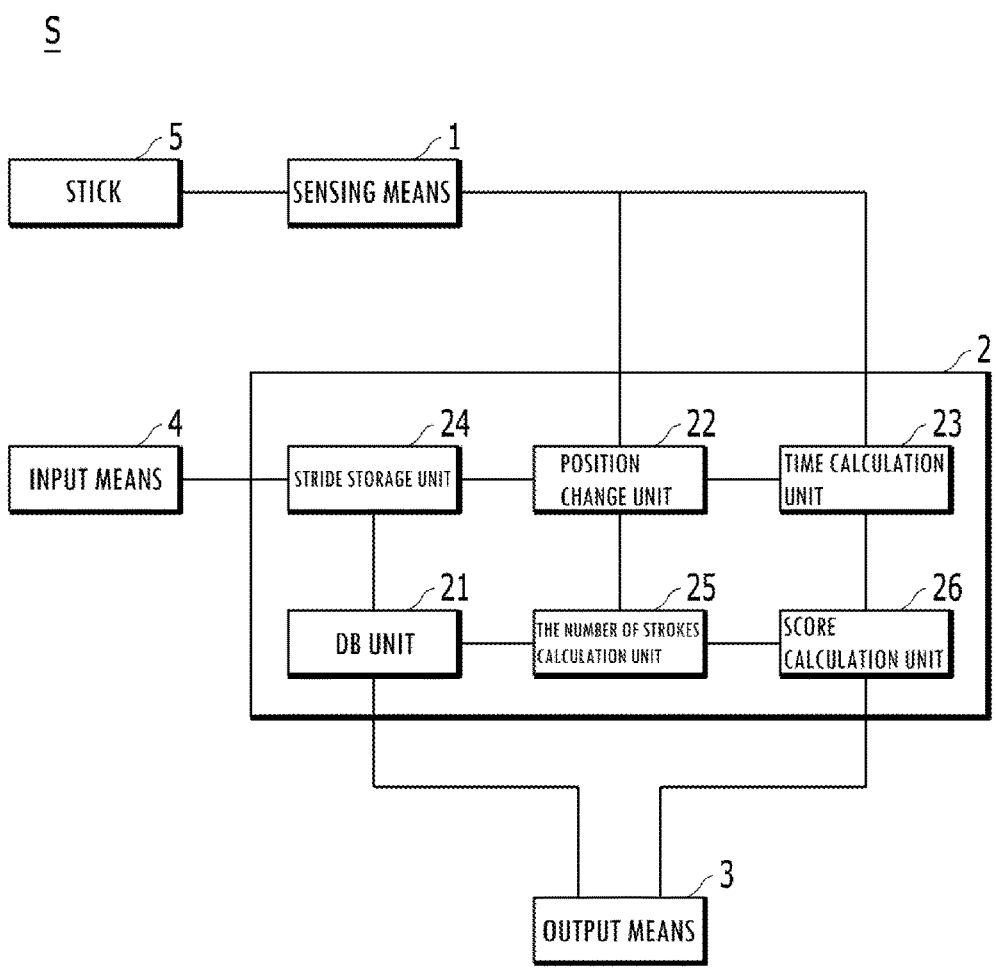
FIG. 1 is a schematic block diagram for describing a virtual extreme golf system according to an embodiment of the present invention.
Figure 2:
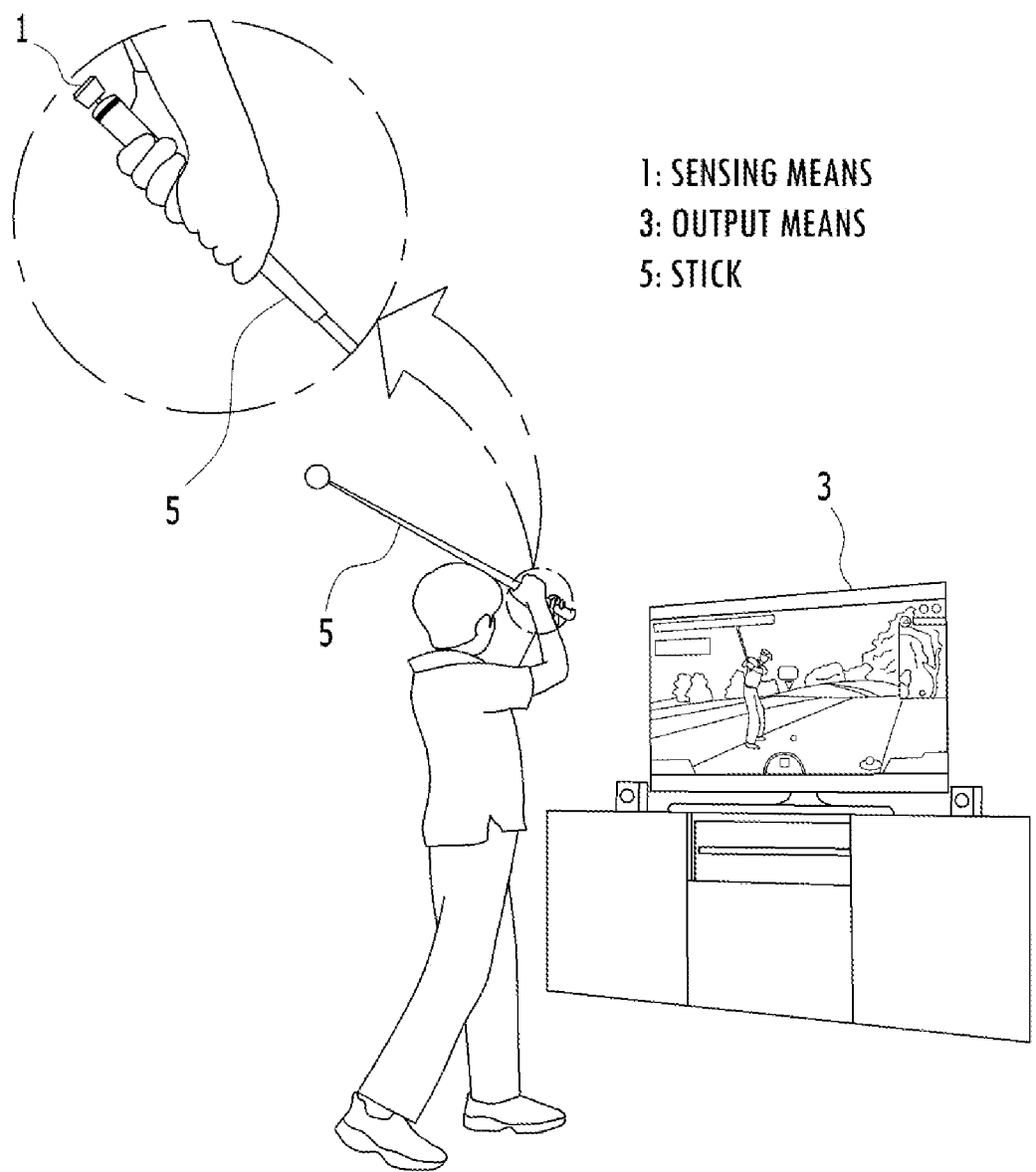
FIG. 2 is a use state diagram of the virtual extreme golf system.

FIG. 1 is a schematic block diagram for describing a virtual extreme golf system according to an embodiment of the present invention, and FIG. 2 is a use state diagram of the virtual extreme golf system.

A virtual extreme golf system S according to an embodiment of the present invention is designed to allow a user to enjoy extreme golf in an indoor space, and hereinafter, for convenience of description, will be referred to as "the present system."

Referring to FIGS. 1 and 2, the present system (virtual extreme golf system S according to an embodiment of the present invention) includes a sensing means 1, a control means 2, and an output means 3.

The present system may include a stick 5 having a shape corresponding to a golf club.

The sensing means 1 measures a user's step to generate step information, and measures angular velocity and acceleration of the stick 5 to generate swing information.

For example, the sensing means 1 may include a 6-axis sensor or a 9-axis sensor (inertial measurement unit (IMU)), and may be connected to an end portion of the stick 5 as illustrated in FIG. 2.

The 6-axis sensor includes a gyroscope that measures a rotation angle (angular velocity) per time, and an acceleration sensor that measures inclination and acceleration by decomposing gravitational acceleration. The 9-axis sensor is a known sensor including a geomagnetic sensor that measures how much a magnetic flux is distorted with respect to a magnetic north by measuring the strength of the magnetic flux based on the magnetic north in the 6-axis sensor.

In the present system, the 6-axis sensor or the 9-axis sensor is provided on the stick 5 so that a user may generate the swing information by measuring the angular velocity, the acceleration, the degree of inclination, and the like of the stick 5.

The control means 2 includes a DB unit 21 in which course information is stored, and a position change unit 22 that changes a position of a ball on a course by using the swing information and generates position information on the position of the ball.

The control means 2 may be a configuration corresponding to a server communicating with a client installed in the output means 3, the input means 4, etc., which will be described later, and various control configurations or computing devices (e.g., various electronic devices or electronic modules such as a computer and a processor) known to those skilled in the art may be applied. For example, the control means 2 may be communicatively connected to the sensing means 1 and an input means 4 to be described later, respectively, to receive the step information, the swing information, and the like described above, and may be configured to transmit signals, information, data, commands, and the like generated according to programs or algorithms included in the above-described position change unit 22, and a time calculation unit 23, a stride storage unit 24, the number of strokes calculation unit 25, a score calculation unit 26, and the like of the control means 2, respectively, to be described later, to the above-described position change unit 22 and the time calculation unit 23, the stride storage unit 24, the number of strokes calculation unit 25, and the score calculation unit 26, respectively, to be described later, and an output means 3 to be described later.

In general, in the golf, a trajectory of a golf ball is determined by an inclination, a swing angle, angular velocity, acceleration, etc., of the golf club to move a golf ball, and a method of changing a position of a ball (golf ball) on a golf course included in course information using swing information and generating the position information is a known technique (refer to Registration Patent No. 10-2203176 as the related art described above), and therefore, a more detailed description thereof will be omitted.

The output means 3 is a display device, and may be, for example, a TV, a smart phone, a tablet PC, a desktop monitor, etc., and receives and outputs one or more of the above-described course information and position information, and time information to be described later. Also, a ball (golf ball) disposed on a course is output according to the position information.

Hereinafter, a method of implementing a virtual extreme system using step information generated by measuring a user's step, which may be a core of the present system, will be described.

As described above, the sensing means 1 (e.g., a 9-axis sensor or a 6-axis sensor) may be provided on the stick 5, and when a user walks in place (including leap step) while holding the stick 5, the stick 5 moves up and down, and for example, the sensing means 1 may generate the step information by measuring acceleration (or gravity acceleration) of the stick 5 in a Z-axis direction. That is, the above-described step information may include the acceleration of the stick 5 in the Z-axis direction (parallel to a vertical direction).

In this case, the control means 2 may include the time calculation unit 23 that calculates a movement time of a user from a position of a ball before the swing of the stick 5 to a position of a ball after the swing of the stick 5 on the golf course included in the course information by using the step information to generate the time information.

Describing in more detail, the time calculation unit 23 may calculate a distance between the position of the ball before the swing and the position of the ball moved by the position change unit 22 after the swing on the course included in the course information.

In addition, the time calculation unit 23 may receive the step information, and recognize, as one step, a previous time when a direction of the acceleration (e.g., the acceleration in the Z-axis direction) of the stick 5 changes and a time after a direction of the acceleration (e.g., the acceleration in the Z-axis direction) of the stick 5 changes after the previous time. That is, the time calculation unit 23 may calculate the number of steps of the user by using the number of times the direction of the acceleration of the stick 5 changes.

In this case, the present system may include the input means 4 (e.g., a smart phone, a tablet PC, etc.) installed with a client provided with a user interface, and the control means 2 may include the stride storage unit 24 in which a user's stride determined according to setting information transmitted from the input means 4 is stored.

That is, when the user inputs the user's stride (e.g., 1 m) through the input means 4, the input means 4 generates the setting information including the user's stride, and the stride storage unit 24 receives and stores the above-described setting information.

In this case, the time calculation unit 23 may receive the setting information from the stride storage unit 24 and generate the time information using the step information and the user's stride.

That is, as described above, it is said that the time calculation unit 23 calculates the number of times of steps through the step information. The time calculation unit 23 may calculate a moving speed of a user by multiplying the number of times of steps by the user's stride, and calculate the movement time of the user by dividing the distance between the position of the ball before the swing and the position of the ball after the swing by the moving speed of the user, thereby generating the time information.

It has been described above that the output means 3 may receive and output one or more of the course information, the position information, and the time information.

In this way, the present system has the advantage of not only changing the position of the ball on the course by calculating the trajectory of the ball based on the swing information, but also allowing the user to enjoy extreme golf in an indoor space by measuring the user's step to detect the moving speed of the user on the course (on a virtual course output from the output means 3).

In addition, as described above, since the sensing means 1 detects the lifting movement of the stick 5 to generate the step information, the user's step in place (or leap step in place) may be detected, and as a result, even in a narrower indoor space, it has the advantage of allowing a user to enjoy a virtual extreme golf game.

In addition, there is the advantage in that, since the time calculation unit 23 generates the time information using the user's stride, the time calculation unit 23 calculates the moving speed of the user differently according to the user's stride and applies the calculated moving speed to more diverse users to implement a more accurate extreme golf game.

Referring to FIGS. 1 and 2, the control means 2 may include the number of strokes calculation unit 25 that generates the number of strokes information by calculating the number of strokes up to hole-in based on the swing information and the position information.

For example, the number of strokes calculation unit 25 may calculate one-time swing as one stroke. For example, the number of strokes calculation unit 25 may calculate the number of times of swings as the number of strokes until a hole cup on the course of the course information and the position of the ball on the course generated by the position change unit 22 match to generate the number of strokes information.

In addition, the control means 2 may include a score calculation unit 26 that calculates a score using the number of strokes information and the time information.

The score calculation unit 26 may receive the number of strokes information and change the number of strokes to a score (hereinafter referred to as a score based on the number of strokes), and assign, for example, one point to one stroke.

In addition, the score calculation unit 26 may receive the time information and change the movement time of the user to a score (hereinafter, a score based on the movement time of the user), and assign, for example, one point per minute. That is, since 60 points are assigned per time, the score based on the movement time of the user may be weighted 60 times the score based on the number of strokes.

The score calculation unit 26 may generate score information by calculating a score, and the output means 3 may output the score information.

In this way, the present system may score and quantify the time information and the number of strokes, and output the scored and quantified time information and number of strokes, so the user's score and scores of other users may be quantitatively compared. In addition, since the score based on the movement time of the user is weighted to the score based on the number of strokes, a more extreme golf game may be implemented by highlighting the user's movement time more.

The present invention having the above configuration and features has the effect of enable a user to enjoy an extreme golf in an indoor space by including a sensing means that measures a user's step and control means that calculates a user's moving time using step information.

In addition, the present invention has the effect of enabling a user to enjoy an extreme golf game in a smaller indoor space by allowing a sensing means provided in a stick to generate step information as the stick moves up and down.

In addition, the present invention has an effect of reflecting a user's stride in an extreme golf game by including a stride storage unit in which the user's stride determined according to setting information transmitted from an input means is stored, and allowing a time operation unit to generate time information using step information and the user's stride.

The present invention described above with reference to the accompanying drawings is capable of various modifications and changes by those skilled in the art, and such modifications and changes should be construed as being included in the scope of the present invention.

What is claimed is:

1. A virtual extreme golf system, comprising:
a sensor that generates step information by measuring a user's step and generates swing information by measuring angular velocity and acceleration of a stick;
a controller that includes a database (DB) unit in which course information is stored, a position change unit changing a position of a ball on a course through the swing information and generating position information of the ball, and a time calculation unit that generates time information by calculating a movement time of the user to a position of the ball before the swing and a position of the ball after the swing on the course by using the step information; and
an output device that receives and outputs at least one of the course information, the position information, and the time information,
wherein the sensor is provided on the stick and generates the step information as the stick moves up and down when the user walks in place while holding the stick.

2. The virtual extreme golf system of claim 1, wherein the controller further includes a stride storage unit in which the user's stride determined according to setting information transmitted from an input device is stored,
wherein the time calculation unit generates the time information by using the step information and the user's stride.

3. The virtual extreme golf system of claim 1, wherein the controller further includes:
a number of strokes calculation unit that calculates the number of strokes up to a hole-in based on the swing information and the position information to generate the number of strokes information; and
a score calculation unit that calculates a score by using the number of strokes information and the time information,
wherein the score is made by a sum of the score by the number of strokes and the score by the movement time of the user, and the score based on the movement time of the user is weighted 60 times the score based on the number of strokes.

<p style="text-align:center">* * * * *</p>